3,200,030
METHOD OF PATCHING WOOD VENEER AND MANUFACTURING VENEER-PAPER LAMINATES

Katashi Oita, Seattle, Wash., assignor to Weyerhaeuser Company, Tacoma, Wash., a corporation of Washington
No Drawing. Filed Aug. 22, 1961, Ser. No. 133,025
9 Claims. (Cl. 161—113)

This invention relates to a method of providing improved veneer-paper laminates by providing improved veneer-core sheets and specifically relates to the filling of voids in the veneer-core sheet with an improved patching composition comprising a cork-rich coniferous bark fraction, a bark fraction having cork as the major component thereof which has been taken from the bark of a coniferous tree, a natural resin product, and a plasticizer.

While it is desirable to use solid sheets of veneer for the core material in a wood-paper laminate so that there will be no voids in the core to form weak areas in the laminate, it is economically necessary to use grades of veneer which have these voids. Furthermore, it is customary in the manufacture of veneer-paper laminates to use random width veneer sheets which are crowded in successive edge-abutted relationship in a continuous production line flow and to apply adhesively coated paper "overlays" to one or both sides by means of heated pressure rolls. It is, therefore, necessary to patch the veneer prior to incorporating it into the laminate. In the past this has been accomplished by removing a portion of the veneer from around the void and inserting a solid veneer patch in its place. Both the cut-out portion and the patch were of predetermined shape. The procedure was both costly and time consuming.

Other procedures tried have used various patching compounds comprising fibrous material and resins but have not been completely successful in securing the desired characteristics of wood in the completed patch nor in securing the complete bonding of the "overlay" paper to the patched area.

A patching composition for such purpose should have certain desirable characteristics over a range of temperature of about 0° F. to 100° F. including those of hardness, toughness and flexibility. Specifically, the completed patch should be easily sawed without clogging the saw, routed without breaking up or chipping away, nailed without splitting or cracking, and should be non-bleeding. It should adhere well to both the surrounding void edges and to the adhesively coated paper overlay sheets. Moreover, such composition is preferably thermoplastic and capable of softening under heat and pressure with some flow to insure complete filling of the voids and the providing of a smooth exterior surface finish.

Therefore, it is a primary object of this invention to provide a veneer-paper laminate in which the voids of the veneer-core sheet are filled with a thermoplastic patching composition.

It is a further object of this invention to provide a veneer-core sheet in which the voids are filled with a thermoplastic patching composition having many of the characteristics of wood.

It is another object of this invention to produce a thermoplastic patching composition having good adhesion to wood and paper, together with toughness and absence of excessive softness.

I have found that the composition of matter comprising a cork-rich coniferous bark fraction in combination with a natural resin product and a plasticizer, such as a tall oil derivative, is useful in filling the voids in wood veneer because it has properties closely resembling the properties of wood.

Accordingly, another object of this invention is to provide a veneer-paper laminate in which the voids of the veneer-core sheet are filled with a patching composition comprising a cork-rich coniferous bark fraction, a natural resin product and a plasticizer.

Another object of this invention is to provide a void filling composition comprising a cork-rich coniferous bark fraction, a natural resin product, and a tall oil derivative which is useful in preparing veneer-core sheets for the manufacture of veneer-paper laminates.

The cork component obtained from coniferous trees is not to be confused with the cork of the Mediterranean cork oak. Mediterranean cork oak bark is not thermoplastic. It is true that Mediterranean cork oak bark is sometimes bound under pressure and heat, but such binding comes about as a result of the cementing action of a resin surrounding the cork cells. The individual cork particles remain discrete, even when bonded together by the inter-cellular resin content of Mediterranean cork. This is quite contrary to the action of the cork from coniferous trees, inasmuch as such cork flows upon the application of heat and pressure of the order of 400 pounds per square inch at 400° F., and congeals upon cooling to an amorphous, homogenous solid.

Cork derived from the bark of coniferous trees differs further from that of the Mediterranean cork oak in that it demonstrates its thermoplastic properties at temperatures which are far below those necessary to soften the resinous content of the cork oak bark.

Still further differences between the cork of coniferous trees and Mediterranean cork with respect to their physical and chemical properties are pointed out in the patent of Robert D. Pauley, U.S. Patent No. 2,773,847, filed July 1, 1948, for Bark Components as Resin Ingredients.

This coniferous cork is the major component of the coniferous bark fraction in the invention. In the coniferous bark fraction that is preferable for the present composition, the cork forms approximately 68% of the total fraction. This amount can vary by as much as 5% in either direction because of the difficulties in separation of the various materials of the bark. It is also preferable that the particle size of this bark fraction should be such that 95% will pass through a 65 mesh screen and 65% will pass through a 200 mesh screen. However, the particle size will depend in part on the use and the curing time of the material.

The present composition should contain between 50 to 60% of this cork-rich coniferous bark fraction. The remaining portion of the composition should be a natural resin or a natural resin product having a softening point higher than 85° C. and a minor portion of a tall oil derivative. The natural resin product may be an extracted pine wood pitch resin, such as "Vinsol." A more complete discussion of "Vinsol" may be found in U.S. Patent No. 2,387,683 and on pages 608 and 609 of "Wood Chemistry," second edition, edited by Louis E. Wise and Edwin C. John, and published in 1952 by Reinhold Publishing Corporation of New York, New York.

The tall oil derivative is present in an amount ranging from 5 to 8% of the total patching composition. Tall oil derivative, as used herein, refers to distilled tall oil and fatty acids of tall oil as these materials are sold in the trade and as discussed on pages 610–614 of the book "Wood Chemistry," above referred to. Typical examples of each are those identified as "Pamak 25" and "Pamak 4A" sold by Hercules Powder Company. "Pamak 25" is understood to comprise 26.5% rosin acids and 71.6% fatty acids and is considered to be a distilled tall oil. "Pamak 4A" is understood to comprise 4.5% rosin acids and 91.5% fatty acids and is considered to be a fatty acid of tall oil.

The following examples are considered to illustrate preferred compositions:

*Example 1*

A mixture containing 50% of a cork-rich coniferous bark fraction from Douglas fir having the preferred composition, "Silvacon 383 G," and, 44% "Vinsol" and 6% distilled tall oil, "Pamak 25," was compounded on a roll mill having one cold roll and one roll heated to 300° F. until it formed a composite sheeted mass. The material was then removed from the mill, cooled, and subsequently ground to a particle size of between 14–50 mesh. The particulate material was then used to patch voids in veneer by being placed in the void and subsequently heated under pressure so that it flowed, filling the entire void, and then cooled so that it again formed a composite mass. The material exhibited many of the properties of wood and adhered well to both wood and paper. There was no noticeable chipping, splitting, or breaking of the patches on either sawing, nailing, or routing.

*Example 2*

This material is made in the same manner as Example 1, except that 6% of a fatty acid of tall oil, "Pamak 4A" was used in place of "Pamak 25" and the cooled material was ground to a particle size of between 14–40 mesh. It exhibited the desired properties.

*Example 3*

This material is made in the same manner as Example 1, except that the composition comprised 55% of the cork-rich coniferous bark fraction, 37.5% "Vinsol," and 7.5% distilled tall oil, "Pamak 25." It exhibited the desired properties.

*Example 4*

This material is made in the same manner as Example 1, except that the composition comprised 54% of the cork-rich coniferous bark fraction, 40% "Vinsol," and 6% distilled tall oil, "Pamak 25." It exhibited the desired properties.

While the above examples describe the preferred composition of the invention, it will be apparent that many changes and modifications may be made in the methods of procedure and the composition without departing from the spirit of the invention. It should, therefore, be understood that the examples cited and the methods of procedure set forth above, are intended to be illustrative only and are not intended to limit the scope of the invention.

What is claimed is:

I claim:

1. In the process of bonding paper overlays to wood veneer-core sheets under hot pressing conditions the improvement which consists in filling the voids of said veneer-core sheets with a thermoplastic composition comprising from 45–60% of a cork-rich coniferous bark fraction, from 5–10% of a tall oil derivative, and from 22–50% of a pine wood pitch resin prior to a hot-pressing operation.

2. The process of claim 1 in which the tall oil derivative is fatty acids of tall oil.

3. The process of claim 1 in which said bark fraction is derived from Douglas fir bark.

4. The process of claim 1 in which said pine wood pitch resin is Vinsol resin.

5. A wood veneer-paper laminate having a wood veneer-core sheet in which the voids in said core sheet are filled with a thermoplastic patching composition comprising from 45–60% of a cork-rich coniferous bark fraction, from 5–8% of a tall oil derivative, and from 22–50% of a pine wood pitch resin.

6. The product of claim 5 in which said pine wood pitch resin is Vinsol resin.

7. A thermoplastic patching composition comprising from 45–60% of a cork-rich coniferous bark fraction, from 5–8% of a tall oil derivative, and from 22–50% of a pine wood pitch resin.

8. The composition of claim 7 in which said pine wood pitch resin is Vinsol resin.

9. The composition of claim 7 in which said bark fraction is derived from Douglas fir bark.

References Cited by the Examiner

UNITED STATES PATENTS

| | | | |
|---|---|---|---|
| 1,665,718 | 4/28 | Pater | 106—163 |
| 2,350,252 | 5/44 | Sackett | 106—123 |
| 2,419,614 | 4/47 | Welch | 161—113 |
| 2,503,407 | 4/50 | Perry | 162—180 |
| 2,507,465 | 5/50 | Ayers | 106—288 |
| 2,647,063 | 7/53 | Willis et al. | 106—123 |
| 2,690,986 | 10/54 | Vallersten | 156—94 |
| 2,736,863 | 2/56 | Heritage | 161—211 |

OTHER REFERENCES

Industrial Finishing for January 1960, "Patching Small Blemishes in Pre-Finished Plywood" (page 82, cited).

EARL M. BERGERT, *Primary Examiner.*